July 7, 1925.

T. MILLER 1,544,674

APPARATUS FOR MAKING COFFEE

Filed April 25, 1924

INVENTOR
Theodore Miller
BY
Willis Fowler
ATTORNEY

Patented July 7, 1925.

1,544,674

UNITED STATES PATENT OFFICE.

THEODORE MILLER, OF BROOKLYN, NEW YORK.

APPARATUS FOR MAKING COFFEE.

Application filed April 25, 1924. Serial No. 708,845.

*To all whom it may concern:*

Be it known that I, THEODORE MILLER, a citizen of the United States, residing in Brooklyn, Kings County, and State of New York, have invented certain new and useful Improvements in Apparatus for Making Coffee, of which the following is a specification.

My invention relates generally to apparatus for making an infusion from ground material and hot liquids, and my present improvements refer more particularly to drip and filter devices especially adapted for making an infusion of coffee. Some of the objects of the present invention are to increase the facility with which the boiling liquid may be passed through from the liquid receptacle or receiver to the ground material beneath; to prevent the ground material from backing up into the water receptacle and avoiding sudden and violent eructations; to retard the speed with which the infusion passes from the ground material into the infusion vessel where it is stored for use, and to avoid trapping air in the device when assembling it. With these and other objects in view, my invention consists in the various novel and peculiar constructions and arrangements of the several different parts of the apparatus, all as hereinafter fully described and set forth and particularly pointed out in the claims.

Figure 1:
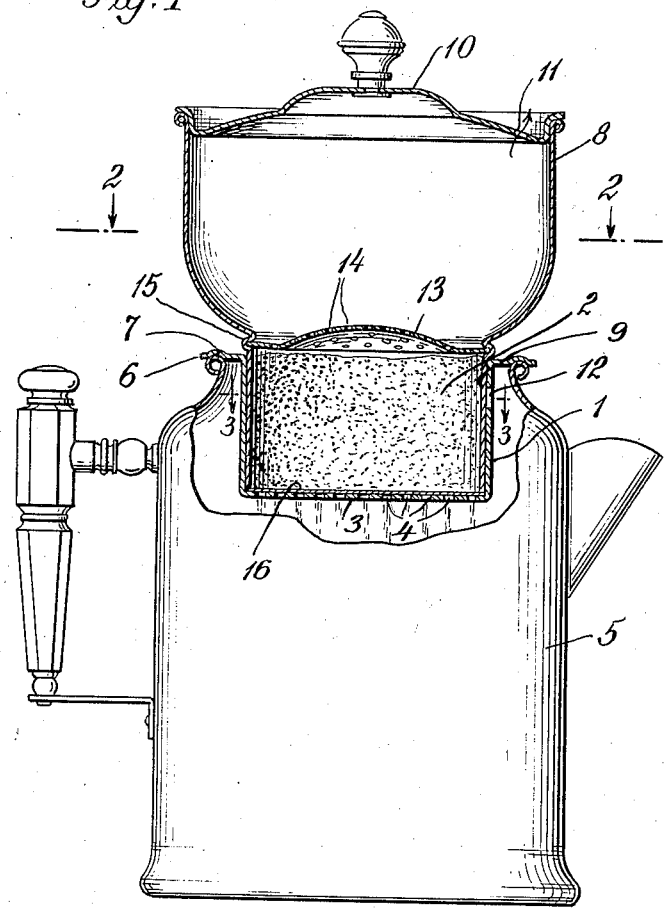

I have illustrated a type of my invention in the accompanying drawings, wherein, Fig. 1, shows apparatus for making an infusion of coffee, with the drip device in vertical section.

Figure 2:
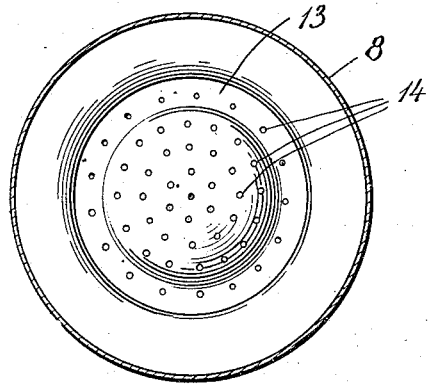
Figure 3:
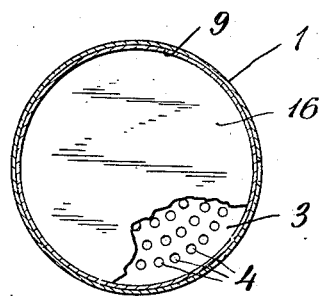

Fig. 2, is a horizontal sectional view, on plane 2—2, and Fig. 3, a similar view on plane 3—3, in Fig. 1.

Referring to the drawings, 1 is an open top cylindrical cup for holding the ground material, such as coffee, indicated at 2. The bottom 3, of the cup is provided with perforations 4, which lead into the infusion vessel 5, on which the device is placed in making the infusion of coffee. The upper end of the body 1, is provided with an outwardly extending flange 6, by which the same is supported upon the upper edge of the vessel or pot 5, into which it depends. This flange or lip 6, is formed with a groove 7, annular in arrangement and of the same diameter as the edge of the vessel and is designed to fit snugly upon such edge making it vapor or steam tight and at the same time the groove serves to center the body 1, in the mouth of the vessel 5.

The liquid receptacle or receiver 8, is removably placed within and above the cup 1, and is circular in cross-section with the top and bottom open. The lower part of the receptacle is contracted at 9, and this cylindrical part fits snugly within said cup with which it telescopes and extends to the bottom thereof making contact with the perforated bottom. The upper end of the receptacle may be closed with a removable lid 10, having a vent hole 11. The lower part 9, of the receptacle which slides in and out of the cup, having solid imperforate walls, I provide the contacting walls of the cup, with an air-vent 12, for preventing air from being pocketed or trapped when the receptacle is pushed into place in the cup. As the receptacle wall covers the vent 12, when the parts are assembled, none of the ground material can escape through the vent, and the liquid is likewise prevented from reaching the vent.

The receptacle makes such a snug fit with the interior of the cup that they hold together as a unit when assembled and the cup is filled with ground-coffee.

Across the interior of the receptacle 8, is fixed a diaphragm or plate 13, provided with numerous perforations 14, and which serves as a spreader or distributor of the liquid which descends into the receptacle, thereby distributing it well over the mass of ground material lying beneath the spreader. The central and main portion of the spreader 13, is formed concavo-convex with the convexity uppermost, and this is an important feature of my invention. This dome-like formation of the spreader plate disposes the perforations thereof on various different levels, some of them being on the horizontal rim part of the plate and the others at graduated heights up the slope of the raised portion. This peculiar arrangement allows the air to get out from the cup, as you pour the boiling liquid, slowly at first, into the receptacle. As the liquid falls upon the spreader plate, it first covers the lowermost perforations thereof on the flat rim part, and then gradually covers the perforations on the raised part, meanwhile the air readily escapes through the uncovered perforations, thereby quickening the escape of air and the passage of the liquid through the spreader. This avoids the undesirable condition of having the liquid stand for a considerable time and not go through the perforations of the spreader and which condition arises when the spreader plate is flat with its perforations upon the same plane or level. With the raised center, the liquid filters through at once. Moreover, when boiling liquid is poured into the receptacle at the top and finds its way to the vessel at the bottom, a partial vacuum is created in the apparatus and this acts to assist the filtration of the liquid into and through the ground-material in the cup. As the perforations in the highest part of the dome-shaped spreader are the last to be covered by the incoming liquid, the outgoing air from the cup is caused to ascend therefrom centrally of the spreader, while the descending liquid at first passes down through the spreader peripherally thereof.

The circular plate forming the spreader is secured permanently in place by spinning a groove 15 in the interior wall of the receptacle at the upper end of the contracted part 9, and then clamping the edge of the plate therein, as shown in Fig. 1, by suitable pressure.

In order to check the flow of liquid from the cup 1, into the vessel below, I provide a retarding medium in the way of a sheet of filter-paper 16, of a special construction and texture. This sheet is circular in shape and of the same diameter as the interior of the cup and rests flatly upon the perforated bottom 3, thereof so as to cover the perforations 4, and impede the passage of liquid from the cup. The filter-sheet is held down in taut position by the periphery of the lower end of the receptacle, as indicated in the drawings, the part 9, being designed to thus clamp the sheet against the perforated bottom of the cup.

From the foregoing description it will be readily understood that in operating the device, the ground material, such as coffee, is placed in the cup before the receptacle is put in place, and after the filter sheet has been placed on the bottom of the cup so as to cover the perforations therein. The receptacle is then applied by telescoping its lower part 9, within the cup 1, forcing it down through the ground material until it is stopped by the bottom of the cup. The device is then placed upon the upper end of the pot 5, and the boiling water in a given quantity is poured into the receptacle, preferably slowly at first, and then faster, whereupon the cover is applied to the top of the receptacle and the water permitted to slowly filter through the ground material to make the infusion, the passage of which into the vessel is retarded by the filter-sheet to such a degree that it is only necessary to pass the liquid through the material, but a single time. Thus the slow passage of the infusion into the vessel below, saves the trouble of re-pouring the infusion through the device to increase its strength, as is often done in many drip-devices now in use. The filter sheet used with the device may be made of any suitable material, either of a special paper or cloth, and it should be used but once in order to make the process more sanitary, and to prevent contamination of the new infusion by particles remaining from a previous making of coffee. In addition to the filter sheet checking the too rapid passage of the infusion from the ground material, it also serves to strain and filter the infusion thereby producing a clear infusion free from grounds.

Having thus described my invention, what I claim and desire to secure by Letters Patent, is:

1. In apparatus for making an infusion of coffee, a drip device including a ground-coffee cup having a perforated bottom, a detachable hot-water receptacle having its lower part telescoping within said cup and having a perforated spreader plate or distributor extending across its interior with said perforations in communication with said cup, the said spreader or distributor being convex upon its upper side with a flat perforated area surrounding said convexity so that the perforations therein are disposed on different levels.

2. In apparatus for making an infusion of coffee, a drip-device including a ground-coffee cup having a perforated bottom, a separable hot-water receptacle disposed above said cup and having a perforated shower or distributor plate across its interior with said perforations in communication with said cup, a depending part on said receptacle extending within and to the bottom of said cup and snugly fitting the interior thereof, a filter-sheet placed on the perforated bottom of said cup and shaped to fit the same and having its marginal edge engaged by said extension of said receptacle and serving to clamp the said sheet against said bottom to hold the sheet in place thereon.

3. In apparatus for making an infusion of coffee, a drip-device comprising a ground-coffee cup having a perforated bottom, a demountable hot-water receptacle fitting snugly within said cup and provided with a spreader plate or distributor having perforations communicating with said cup, the wall of said cup being provided with an air-vent for escape of air when said receptacle is seated within said cup.

4. In apparatus for making an infusion of coffee, a drip-device comprising a ground-coffee cup, and a hot-water receptacle arranged above the same and provided with a spreader plate mounted across the interior of said receptacle, a peripheral spun groove within the interior wall of said receptacle and the edge of said spreader plate being pressed in said groove in fixed position therein.

5. In apparatus for making an infusion of coffee, a drip-device including a ground-coffee cup having the lower part provided with perforations for the passage of the infusion, an open ended hot-water receptacle fitting securely within said cup, the said cup being provided with an exterior supporting flange formed on its under side with an annular groove, a vessel in the mouth of which said device is mounted so that said flange groove receives the upper end of said vessel to form a closure therewith and suspend the cup with its receptacle within said vessel.

6. In apparatus for making an infusion of coffee, an infusion pot, a cup having a perforated bottom for holding the ground-coffee and provided at its upper end with an outwardly extending flange for engaging the rim of said pot and holding the cup suspended within said pot, a hot-water receptacle open at its lower end and having its lower part fitting snugly within said cup so as to detachably unite it therewith and being supported thereby, said telescoping receptacle being provided with a distributor disposed therein above the ground-coffee, said cup and attached hot-water receptacle being together removable from said pot by lifting said hot-water receptacle.

THEODORE MILLER.